3,829,454
PROCESS FOR PREPARING N-MONO-(β-CYANO-
ETHYL)-ARYLAMINES
Hans Jakob Schladetsch, Frankfurt am Main, Germany,
 assignor to Farbwerke Hoechst Aktiengesellschaft
 vormals Meister Lucius & Bruning, Frankfurt am Main,
 Germany
No Drawing. Filed Dec. 14, 1970, Ser. No. 98,126
Claims priority, application Germany, Dec. 16, 1969,
 P 19 63 010.5; Nov. 16, 1970, P 20 56 215.6,
 P 20 56 216.7
Int. Cl. C07c 121/02
U.S. Cl. 260—465 E     6 Claims

ABSTRACT OF THE DISCLOSURE

Process for preparing N-(β-cyanoethyl)-arylamines of the formula

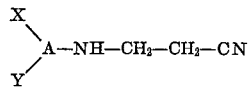

wherein A represents phenyl, naphthyl, anthracenyl or anthraquinonyl, X stands for hydrogen, fluorine, chlorine or bromine atoms, alkyl of $C_1$ to $C_5$, alkoxy of $C_1$ to $C_4$, trifluoromethyl, phenyl, phenoxyl, benzoyl-alkylsulfonyl of $C_1$ to $C_6$, N,N-dialkyl-amidosulfone of $C_2$ to $C_8$ and phenylazo, Y represents hydrogen, fluorine or chlorine atoms, a nitro group, alkoxy of $C_1$ to $C_4$ and alkyl-fluoroalkyl-alkoxy of $C_1$ to $C_4$, by reacting a N-(β-cyanoethyl)-aryl-formamide of the formula

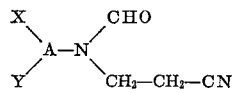

wherein A, X and Y are defined as above, with diluted aqueous mineral acids, in the presence of a solubilizer and at an elevated temperature.

---

It is known that N-(β-cyanoethyl)-anilines can be prepared by reacting anilines with acrylonitrile in the presence of suitable catalysts or by subjecting aniline salts to an exchange-reaction with 3-diethylamino-propionitrile according to Cymermann-Craig. However, it is also known that in these reactions the N-mono-(β-cyanoethyl)anilines are obtained with unsatisfactory yields only or with insufficient purity and uniformity.

On the other hand, it is known that cyanoethylated amides can be converted into the correspondingly substituted β-alanines with the aid of concentrated hydrochloric acid and under simultaneous hydrolysis of the amide group and terminal nitrile group. In the case of the cyanoethylated N-phenyl-thio-urea, dilute hydrochloric acid is sufficient for splitting off the nitrile group (O. Bayer, Angew. Chem. 61,236 (1949)).

Now, I have found that, surprisingly, N-mono-(β-cyanoethyl)-aryl amines of the general formula (II)

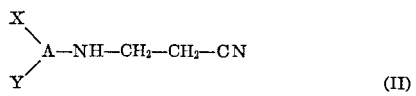

in which A represents a mono- or poly- nuclear aryl radical for example, phenyl, naphthyl, anthracenyl or anthraquinonyl, X represents a hydrogen, fluorine, chlorine or bromine atom, or an alkyl group of 1 to about 15 carbon atoms, an alkoxy group of 1 to about 4 carbon atoms or an aryl radical which may be substituted, for example, a phenyl or naphthyl radical which may be substituted by halogen atoms, for example chlorine or bromine atoms, or alkyl, alkoxy or nitro groups, or a trifluoromethyl group, an alkylenephenyl group the alkylene group of which contains 1 to about 4 carbon atoms, for example the benzyl group, wherein the phenyl radical may be substituted by halogen atoms such as chlorine or bromine atoms or by alkyl, alkoxy or nitro groups, furthermore a phenoxy radical which may be substituted, for example by halogen atoms such as chlorine or bromine atoms or by alkyl, alkoxy or nitro groups, a benzyloxy radical which may be substituted, an alkyl-carbonyl group having 2 to about 5 carbon atoms such as the acetyl group, a benzoyl group which may be substituted by halogen atoms such as chlorine or bromine atoms or by alkyl, alkoxy or nitro groups, an amino group, an alkylamino group having 1 to about 4 carbon atoms, an N-alkyl-N-phenyl-amino group having a total of 7 to about 10 carbon atoms such as the N-methyl-N-phenyl-amino group, an anilino group, a dialkyl-amino group having a total of 2 to about 8 carbon atoms such as the dimethyl-amino group, a lower alkyl-sulfonyl group having 1 to about 6 carbon atoms such as the ethyl-sulfonyl group, a phenyl-sulfonyl group which may be substituted, a benzyl-sulfonyl group which may be substituted at the aromatic nucleus, a N,N-dialkylamido-sulfone group having a total of 2 to about 8 carbon atoms, a N-alkyl-N-phenyl-amidosulfone group or a phenylazo group which may be substituted by halogen atoms such as chlorine or bromine atoms or by alkyl, alkoxy or nitro groups, for example the 2-chloro-4-nitro-phenylazo group, and Y represents a fluorine atom, a chlorine atom, a hydrogen atom, the nitro group, an alkoxy group having 1 to about 4 carbon atoms or an alkyl radical having 1 to about 4 carbon atoms and which may be substituted by halogen atoms or methoxy groups, can be prepared with very good yields and with surprisingly good purity and uniformity by treating N-(β-cyanoethyl)-(arylformamides) of the formula (I)

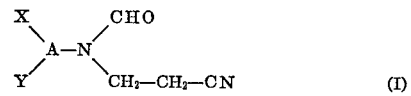   (I)

in which A, X and Y have the meanings given above, are treated with aqueous diluted mineral acids, if desired in the presence of a solubilizer, at temperatures in the range of from 0° to about 100° C., preferably 60° to 100° C.

Suitable N-(β-cyanoethyl)-arylformamides of the mentioned formula (I) are for example:

N-(β-cyanoethyl)-formanilide,
N-(β-cyanoethyl)-2-chloro-formanilide,
N-(β-cyanoethyl)-2-bromo-formanilide,
N-(β-cyanoethyl)-2,5-dichloro-formanilide,
N-(β-cyanoethyl)-3,5-dichloro-formanilide,
N-(β-cyanoethyl)-2-nitro-formanilide,
N-(β-cyanoethyl)-3-nitro-formanilide,
N-(β-cyanoethyl)-4-nitro-formanilide,
N(β-cyanoethyl)-2-chloro-5-methylformanilide,
N-(β-cyanoethyl)-2-chloro-5-methoxy-formanilide,
N-(β-cyanoethyl)-2-ethoxy-5-methyl-formanilide,
N-(β-cyanoethyl)-nonyl-2-methoxy-formanilide,
N-(β-cyanoethyl)dodecyl-formanilide and
N-(β-cyanoethyl)-4-phenyl-formanilide;
2-[N-(β-cyanoethyl)-N-formyl-amino]-diphenylmethane,
N-(β-cyanoethyl)-3-trifluoromethyl-formanilide,
N-(β-cyanoethyl -2-chloro-5-trichloro-methyl-formanilide,
N-(β-cyanoethyl)-2-ethylsulfonyl-5-trifluoromethyl-
  formanilide, N-(β-cyanoethyl)-2-fluoro-5-trifluoromethyl-formanilide,
N-(β-cyanoethyl)-2-phenoxy-formanilide,
N-(β-cyanoethyl)-2-phenoxy-5-chloro-formanilide,
N-(β-cyanoethyl)-2-benzyloxy-5-methyl-formanilide,
4-[N-(β-cyanoethyl)-N-formyl-amino]-benzophenone,
3-[N-(β-cyanoethyl)-N-formyl-amino]-acetophenone,
N-(β-cyanoethyl)-3-amino-formanilide,
N-(β-cyanoethyl)-3-dimethylamino-formanilide,
N-(β-cyanoethyl)-2-methoxy-5-amino-formanilide,
4-[N-(β-cyanoethyl)-N-formyl-amino]-N'-methyl-diphenylamine,
N-(β-cyanoethyl)-2-methoxy-5-ethylsulfonylformanilide,
N-(β-cyanoethyl)-5-methyl-2-n-butylsulfonyl-formanilide,
N-(β-cyanoethyl)-2-phenylsulfonyl-formanilide,
N-(β-cyanoethyl)-2-nitro-4-(4'-chloro-phenylsulfonyl)-formanilide,
N-(β-cyanoethyl)-2-methoxy-5-phenylsulfonyl-formanilide,
N-(β-cyanoethyl)-2-methoxy-5-benzylsulfonyl-formanilide,
N-(β-cyanoethyl)-3-dimethylamidosulfonyl-formanilide,
N-(β-cyanoethyl)-2-methyl-5-dimethylamidosulfonyl-formanilide,
N-(β-cyanoethyl)-2-methyl-5-diethylamidosulfonyl-formanilide,
N-(β-cyanoethyl)-2-methoxy-5-dimethylamidosulfonyl-formanilide,
N-(β-cyanoethyl)-3-(N'-phenyl-N'-methyl-amidosulfonyl)-formanilide,
4-[N-(β-cyanoethyl)-N-formyl-amino]-azobenzene,
4-[N-(β-cyanoethyl)-N-formyl-amino]-2,4'-dimethyl-azobenzene,
4-[N-(β-cyanoethyl)-N-formyl-amino]-3,2'-dichloro-4'-nitro-azobenzene,
1-[N-(β-cyanoethyl)-N-formyl-amino]-naphthalene,
1-[N-(β-cyanoethyl)-N-formyl-amino]-2-methoxy-naphthalene,
1-[N-(β-cyanoethyl)-N-formyl-amino]-7-methoxy-naphthalene,
1-[N-(β-cyanoethyl)-N-formyl-amino]-4-nitro-naphthalene,
1-[N-(β-cyanoethyl)-N-formyl-amino]-5-nitro-naphthalene,
2-[N-(β-cyanoethyl)-N-formyl-amino]-naphthalene,
2-[N-(β-cyanoethyl)-N-formyl-amino]-6-bromo-naphthalene,
2-[N-(β-cyanoethyl)-N-formyl-amino]-1,6-dibromo-naphthalene,
1-[N-(β-cyanoethyl)-N-formyl-amino]-1,4-dimethoxy-naphthalene,
1-[N-(β-cyanoethyl)-N-formyl-amino]-anthracene,
2-[N-(β-cyanoethyl)-N-formyl-amino]-anthracene,
2-[N-(β-cyanoethyl)-N-formyl-amino]-anthraquinone,
2-[N-(β-cyanoethyl)-N-formyl-amino]-1-chloro-anthraquinone,
2-[N-(β-cyanoethyl)-N-formyl-amino]-3-chloro-anthraquinone,
2-[N-(β-cyanoethyl)-N-formyl-amino]-3-bromo-anthraquinone,
2-[N-(β-cyanoethyl)-N-formyl-amino]-3-methoxy-anthraquinone,
1-[N-(β-cyanoethyl)-N-formyl-amino]-2-methyl-naphthalene.

These compounds are accessible in almost quantitative yields according to German Pat. 734,725 by reaction of aryl-formamides with acrylonitrile in the presence of basic catalysts, preferably, however, in the presence of water-containing basic catalysts. The water content may vary within a wide range. For example, it may range from traces of humidity as those which are absorbed after some minutes from the air by the aryl-formamides used or by the pulverized sodium hydroxide to water quantities as those which are present when concentrated or diluted sodium hydroxide solutions are used. In the reaction of aryl-formamides with acrylonitrile, the addition of a solubilizer such as dioxane, ethyleneglycoldiethyl ether or ethyleneglycoldimethyl ether may be of advantage.

As mineral acids for the saponification of the arylformamide of formula (I), there may be used, for example, hydrochloric acid, sulfuric acid, nitric acid or phosphoric acid. These acids, which are used in dilution with water, are preferably employed in concentration of about 1 to about 30% by weight. Very good yields are obtained, for example, with 2-7 N-hydrochloric acid at temperatures in the range of from 60°–90° C.

In general, the reaction times and temperatures are interdependent and depend also on the acid concentration. Thus, if a 4-6 N-hydrochloric acid and a reaction temperature of 80° C. is used, the reaction is in general completed after 20 to 40 minutes. With the same acid concentration and a reaction temperature of 20° C. only, the reaction may require up to 3 days. If 1N-hydrochloric acid is used, a reaction time of about 2 hours is required for splitting-off the formyl group at the boiling temperature of the reaction medium (100° C.). It is preferred to operate with 5N-hydrochloric acid at 80° C., the hydrolysis being in general then completed after 20–40 minutes.

The addition of a solubilizer is recommended if the N-(β-cyanoethyl)-aryl-formamide used as the starting substance as well as the N-(β-cyanoethyl)-arylamine to be expected are sparingly soluble in the reaction medium. Suitable solubilizers are, for example, glacial acetic acid, lower alkanols such as methanol, ethanol, propanol or butanol, glycols such as ethylene-glycol, or glycol ethers such as ethylene-glycol-alkyl-ethers, for example ethylene-glycol-dimethyl-ether.

For isolating the products, the reaction mixture is cooled and adjusted to a pH-value in the range of from pH—1 to pH—12, which is best suited for the isolation. If the products are obtained in crystalline form, they are directly filtered off, washed with water until the filtrate shows a neutral reaction and is free from electrolytes and then dried. If the products are obtained in the form of an oil, they are separated from the aqueous phase, for example, through a separating funnel. In these cases, the addition of a solubilizer which is immiscible with water may in some cases be of advantage.

Sometimes the crude products contain some percents of mineral salts. In general, these salts are not disturbing when the reaction products of the process of the invention are used as herbicides or as dyestuff intermediates. If salt-free products are desired, these may be obtained in a simple manner, with oily products by shaking with water and with crystalline products by melting and shaking with water or by recrystallization from a mixture of alcohol and water.

The surprisingly high efficiency of the process of the invention is shown by the data of the following Table. In column 2 of this Table are indicated those compounds which have been used, in recrystallized or distilled state, for the reaction. Their physical data such as melting points or boiling points are listed in the following column. The formulae of the reaction products and their melting points are shown in columns 6 and 7. The melting points were determined with samples which were recrystallized several times and which were analytically pure. The data regarding the yields and the following melting point in columns 7 and 8 refer to isolated and salt-free crude products or products which contain only traces of a mineral salt, in a few cases also to compounds which have been recrystallized once. When considering the yields and when comparing the melting points of the isolated products which have been used for the determination of the yield with those of the pure compounds it can be observed that, despite the high yields of 94–99%, the depressions of the melting point, in general 1–2° C., are very low. It can be concluded therefrom that the reaction according to the invention takes place practically quantitatively.

TABLE 1

| No. | Starting compound (I) | Melting point or boiling point (°C.) | Method | Reaction product (II) | M.P. (°C.) | Yield | M.P. (°C.) |
|---|---|---|---|---|---|---|---|
| 1 | 2-Cl, 4-CH₃-C₆H₃-N(CHO)-CH₂-CH₂-CN | B.P.=160°/0.7 torr. | Example 1. | 2-Cl, 4-CH₃-C₆H₃-NH-CH₂-CH₂-CN | 37 | 97 | 34-36 |
| 2 | 2-Cl, 4-OCH₃-C₆H₃-N(CHO)-CH₂-CH₂-CN | M.P.=80° | Example 2. | 2-Cl, 4-OCH₃-C₆H₃-NH-CH₂-CH₂-CN | 76 | 96 | 70-72 |
| 3 | 2-Cl, 4-Cl-C₆H₃-N(CHO)-CH₂-CH₂-CN | M.P.=67°; B.P.=172°/0.6 torr. | Example 3. | 2-Cl, 4-Cl-C₆H₃-NH-CH₂-CH₂-CN | 48 | 97 | 43-46 |
| 4 | 2-Br-C₆H₄-N(CHO)-CH₂-CH₂-CN | B.P.=176°/1 torr. | Example 4. | 2-Br-C₆H₄-NH-CH₂-CH₂-N | 41 | 97 | 39-40 |
| 5 | 2,6-Cl₂-C₆H₃-N(CHO)-CH₂-CH₂-CN | M.P.=85° | Example 5. | 2,6-Cl₂-C₆H₃-NH-CH₂-CH₂-CN | 78 | 99 | 76-77 |
| 6 | 4-NO₂-C₆H₄-N(CHO)-CH₂-CH₂-CN | M.P.=84-85° | Example 6. | 4-NO₂-C₆H₄-NH-CH₂-CH₂-CN | [1] 101 | 97 | 99-100 |
| 7 | 2-NO₂-C₆H₄-N(CHO)-CH₂-CH₂-CN | M.P.=84° | Analogous to Example 3. | 2-NO₂-C₆H₄-NH-CH₂-CH₂-CN | 112 | 99 | 107-110 |
| 8 | O₂N-C₆H₄-N(CHO)-CH₂-CH₂-CN | MP=100° | Analogous to Example 3. | O₂N-C₆H₄-NH-CH₂-CH₂-CN | [2] 130 | 94 | [3] 127-130 |
| 9 | C₆H₅-C₆H₄-N(CHO)-CH₂-CH₂-CN | MP=110° | Analogous to Example 5. | C₆H₅-C₆H₄-NH-CH₂-CH₂-CN | [4] 146 | 99 | 145 |

[1] (a) M.P.=95-96°, S.A. Heininger, J. Org. Chemistry 22, 1213 (1957); (b) M.P.=97.5°, J.T. Braunholtz and F.G. Mann, J. Chem. Soc. (London) 1954, 651.
[2] M.P.=128-130°, J.T. Braunholtz and F.G. Mann, J. Chem. Soc. (London) 1953, 1817.
[3] M.P.=of the crude compound=121-130°, 1a.
[4] M.P.=140°, L. Bauer, J. Cymerman und W.J. Sheldon, J. Chem. Soc. (London) 1951, 3313 and 3314.

Since the N-(β-cyanoethyl)-arylformamides of the formula (I) required for carrying out the process of the invention are in general obtained to a large extent in uniform state and with practically quantitative yields, upon their preparation from the corresponding aryl-formamide of the formula (III), they can be subjected, directly after their synthesis, in the same reaction vessel to the hydrolysis according to the process of the invention to yield the corresponding N-(β-cyanoethyl)-arylamines of the mentioned formula (II). It is interesting that even in this prolonged synthesis according to the reaction scheme (I)

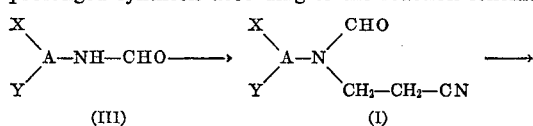

the yields are oscillating around the high value of 95%, referred to the aryl-formamide used.

The following Table 2 lists a number of starting and final products used or obtained according to the reaction scheme (2), without isolation of the N-(β-cyanoethyl)-aryl-formamide (I).

The determinations of the yield were based on the practically pure crude products and the melting point data refer to the recrystallized products.

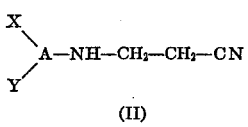

TABLE 2

| No. | Formanilide (III) | Melting point (° C.) | Method | N-(β-cyanoethyl)-anilide (II) | M.P. (° C.) | Yield (percent) |
|---|---|---|---|---|---|---|
| (1) | F₃C—C(OCH₃)—CF₃ substituted phenyl—NH—CHO | 113–114 | Example 9 | F₃C—C(OCH₃)—CF₃ substituted phenyl—NH—CH₂—CH₂—CN | 63–64 | 96 |
| 2 | 2,5-dichlorophenyl—NH—CHO | 143 | Example 10 | 2,5-dichlorophenyl—NH—CH₂—CH₂—CN | 48 | 93 |
| 3 | biphenyl—NH—CHO | ⁵173–174 | Example 11 | biphenyl—NH—CH₂—CH₂—CN | ⁶146 | 98 |
| 4 | 3-methyl-4-ethoxyphenyl—NH—CHO | 77–78 | Analogous to Example 10 | 3-methyl-4-ethoxyphenyl—NH—CH₂—CH₂—CN | 64–65 | 93 |
| 5 | 2-nitrophenyl—NH—CHO | ⁷122 | Analogous to Example 9 | 2-nitrophenyl—NH—CH₂—CH₂—CN | 112 | 98 |

⁵ p=172° C., J. Zimmermann, Ber. dtsch. Chem. Ges. 13, 1967 (1880), Beilst. 12, 1319.
⁶ See footnote 4 at end of Table 1.
⁷ p=122° C., K. v. Auwers. Z. physik. Chem. 23, 459 (1897), Beist. 12, 691.

The process of the invention, involving the hydrolysis of N-(β-cyanoethyl)-aryl-formamides, has also great importance insofar as it offers a new possibility of synthesizing N - mono-(β-cyanoethyl) - aryl - amines from the corresponding arylamines according to the reaction scheme (2)

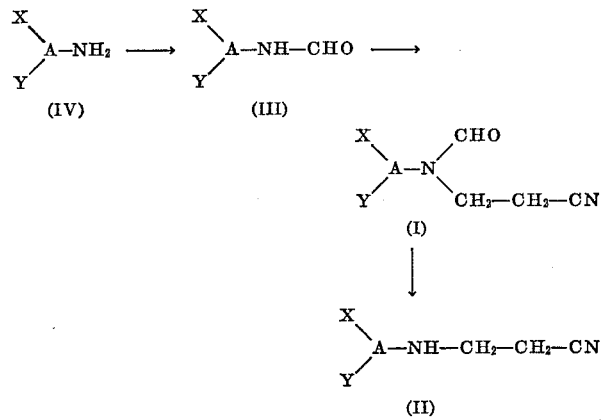

wherein A, X and Y have the meanings given above.

Thus, the process of the mono-cyanoethylation of arylamines is characterized by that N-formyl compounds are first prepared from aryl-amines according to known processes (IV→III), these are cyanoethylated according to known processes (III→I) and the N-(β-cyanoethyl)-aryl-formamides are subjected to an acid hydrolysis according to the process of the invention (I→II).

Isolation of the intermediate compounds of the aryl-formamides (III) and the N - (β - cyanoethyl)-aryl-formamides (I) is possible (cf. Table 1 and Table 2), but often not necessary. Therefore, the synthesis of N-mono-(β-cyanoethyl)-aryl-amides can also be carried out according to the so-called "one-pot" process, wherein generally the reaction products are obtained with very good yields and with a high purity.

This manufacturing process becomes more interesting and important when it is compared with the conventional processes of the mono-cyanoethylation of aryl-amides.

Under conventional cyanoethylation processes there should be understood the following processes:

A. The manufacture of N-mono - (β - cyanoethyl)-aryl-amines by reaction of corresponding arylamines with acrylonitrile in the presence of catalysts such as glacial acetic acid, copper salts or mixtures of glacial acetic acid with copper salts. A characteristic example of this method is the mono-cyanoethylation of 2-chloro-aniline according to S. A. Heininger, as described in Organic Synthesis, Coll. Vol. IV, 146.

B. The manufacture of N-mono - (β - cyanoethyl)-aryl-amines by reaction of salts of the corresponding arylamines with 2-di-ethylamino-propionitrile.

An example of this method is the process for the mono-cyanoethylation of anilines according to J. Cymermann-Craig and M. Moyle, which is likewise contained in the list of methods given in Organic Synthesis (Coll. Vol. IV, 205).

Thus, in contradistinction to the process of the mono-cyanoethylation of primary arylamines catalyzed by copper salts or mixtures of copper salt and glacial acetic acid [S. A. Heininger, J. Org. Chem. 22, 1213 (1957)], the present process yields compounds which 1. show their proper colour already in the crude state and which have not a dark colour which is due to accompanying substances, 2. which in the crude state do not contain metal residues such as copper iron and 3. which are in any case free from di-cyanoethylated compounds. In general, the last mentioned condition is manifested by a higher melting point of the recrystallized compounds. For example, according to the present process a 2-[N-(β-cyanoethyl)-amino]-naphthalene is obtained which, compared with the product obtained according to the comparative process, has a melting point which is by about 7° C. higher, i.e. 106°–107° C., instead of 99°–100° C. [J. T. Braunholtz and F. G. Mann, J. Chem. Soc. (London) 1954, 654].

As compared with the process of mono-cyanoethylation of primary arylamines by reaction of salts of corresponding amines with 2-diethylaminopropionitrile [L. Bauer, J. Cymermann, W. J. Sheldon, J. Chem. Soc. (London) 1951, 3312], the process of the invention gives the N-cyanoethyl-arylamines with essentially better yields. For example, L. Bauer et al. isolate 20.5% of 2-[N-(β-cyanoethyl)-amino]-naphthalene, whereas in the present process, the same compound is obtained via two isolated intermediate steps (cf. Reaction Scheme 2) in a yield of 85% of the theoretically possible yield, referred to the 2-amino-naphthalene used (Example 16).

The following Table 3 lists some of mono-cyanoethyl-anilines and the yields obtained by the two processes A and B and the process of the invention. It can be seen that the process of mono-cyanoethylation via the intermediate steps of formanilide and of N-(β-cyanoethyl)-formanilide gives in all cases the highest yields.

Furthermore, it must be mentioned that the crude products obtained according to the processes A and B generally contain considerable amounts of foreign substances which are very disturbing in the following reactions or use of these cyanoethylated arylamines. These products must then often be subjected to a complicated and expensive purification process, for example distillation in a vacuum produced by oil pumps at a temperature of between 100° and 200° C., or recrystallization from alcohol.

In contra-distinction thereto the products obtained by the present new process are in their crude state practically pure substances which can be used further without purification.

The compounds obtained by the process of the invention are, in the first instance, valuable intermediates for the manufacture of dyestuffs; in the case of the manufacture of azo dyestuffs, the mentioned compounds serve as coupling components. Thus, there is obtained, for example, when coupling diazotized 4-nitro-2-cyano-aniline with N-(β-cyanoethyl)-2-bromo-aniline in an acid medium, the monoazo dyestuff of the formula

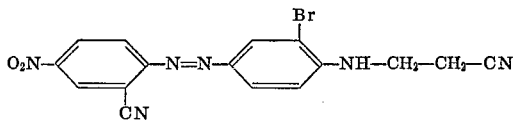

which yields, for example, on cellulose triacetate fibers and non-modified polyester fibres according to dispersion dyeing methods, intense reddish orange dyeings that have very good fastness to light and to sublimation. The mentioned dyestuff is also very well suited for the dyeing of fiber mixtures which contain polyester fibers. Thus, in the dyeing of, for example mixtures of polyester fibers and wool, the woolen portion is dyed only moderately and the dyeing of the wool can be removed easily by a reductive after-treatment or by washing with an emulsifier.

Furthermore, the compounds obtained according to the invention may be used as herbicides.

TABLE 3

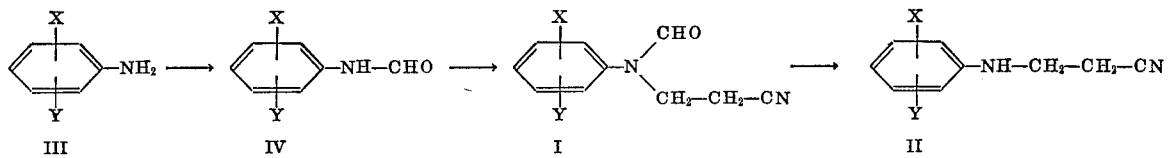

Comparison:
A: Aniline plus acrylonitrile plus catalyst (Heininger).
B: Aniline salts plus 3-diethylamino-propionitrile (Cymerman-Craig).

| No. | II Reaction steps | | Yield (percent) | Melting point or boiling point | Method | Yield (percent) | Melting point or boiling point | Lit. |
|---|---|---|---|---|---|---|---|---|
| 1 | ⟨⟩—NH—CH₂—CH₂—CN | III→II | 96 | M.P.=51–52° | A | 73 | {M.P.=52–53°; M.P.=51.5°} | (8)(9) |
|   |   |   |   |   | B | 78 | {M.P.=48–51°; M.P.=51–52°} | (10)(9) |
| 2 | Cl—⟨⟩—NH—CH₂—CH₂—CN | III→II | 95 | M.P.=49° | A | 65 | M.P.=48–49° | (8) |
|   |   |   |   |   | B | 42 | {M.P.=44–46°; M.P.=48°} | (11)(12) |
| 3 | Cl,⟨⟩—NH—CH₂—CH₂—CN | III→II | 92 | {M.P.=24°; B.P.=139–141°/0.3 torr.} | A | 62 | B.P.=139–141°/0.3 torr. | (8) |
|   |   |   |   |   | B |   | Not isolatable | (13) |
| 4 | Br,⟨⟩—NH—CH₂—CH₂—CN | III→IV→II | 92 | {M.P.=41°; B.P.=137–139°/0.3 torr.} | A | 18 | {M.P.=36–39°; B.P.=137–140°/0.3 torr.} | (16) |
|   |   |   |   |   | B |   | No experiment |   |
| 5 | Cl,⟨⟩—NH—CH₂—CH₂—CN,Cl | III→IV→II | 94 | {M.P.=48°; B.P.=145–147°/0.3 torr.} | A | 35 | {M.P.=39–45°; B.P.=145–149°/0.3 torr.} | (16) |
|   |   |   |   |   | B |   | No experiment |   |
| 6 | H₃CO—⟨⟩—NH—CH₂—CH₂—CN | III→II | 94 | M.P.=61–62° | A | 84 | M.P.=59–61° | (8) |
|   |   |   |   |   | B | 79 | M.P.=62–64° | (14) |
| 7 | ⟨⟩—⟨⟩—NH—CH₂—CH₂—CN | III→IV→II | 96 | M.P.=146° | A | 13 | M.P.=146° | (15) |
|   |   |   |   |   | B | 50 | M.P.=146° | (15) |

⁸ See footnote 1a at end of Table 1.
⁹ R. C. Cookson and F. G. Mann, J. Chem. Soc. (London) 1949, 67.
¹⁰ J. Cymerman-Craig and M. Moyle, Org. Synth. Coll. Vol. IV, 205.
¹¹ R. J. Bates, J. Cymerman-Craig, M. Moyle and R. J. Young, J. Chem. Soc. (London), 1956, 388.
¹² A. F. Bekhli, J. Gen. Chem. (U.S.S.R.), 21, 86 (1951); Chem. Abstracts, Vol. 45, 7540 g.
¹³ S. A. Heininger, Org. Symth. Coll. Vol. IV, 146.
¹⁴ J. Cymerman-Craig, M. Moyle, A. J. C. Nicholsen and R. L. Werner, J. Chem. Soc. (London) 1955, 3628.
¹⁵ See footnote 4 at end of Table 2.
¹⁶ Own experiment analogous to (13).

The following examples illustrate the invention:

EXAMPLE 1

22.25 g. (0.1 mol) of N-(β-cyanoethyl) - 2 - chloro-5-methyl-formanilide (boiling point—160° C./0.7 torr) were introduced into 100 ml. of 5N-aqueous hydrochloric acid which had been heated previously to 80° C. The whole was stirred for 30 minutes at this temperature. At the end of the reaction a clear solution was obtained. For isolating the reaction product, the heating bath was exchanged against an ice/water bath and during cooling the pH was adjusted to 3-4 by addition of about 50 ml. of 33% by weight sodium hydroxide solution. The product which at first was oily, crystallized after some time at 0° to 5° C. For completing the crystallization, stirring was continued for 60 minutes at this temperature. The crystal magma was then filtered off with suction, washed with cold water until the filtrate was neutral and free from electrolytes and dried at room temperature. 19.7 g. of a crude product melting at 28° to 34° C. were obtained. After a single recrystallization from a mixture of alcohol and water, 18.8 g. (97% of the theory), melting point= 34°-36° C. of N-(β-cyanoethyl)-2-chloro-5-methyl-aniline were obtained. After several recrystallizations of the compound until the melting point remained constant, the melting point was found to be 37° C.

The analytical data corresponded to the formula

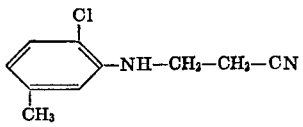

The starting compound used was obtained by reacting 2-chloro-5-methyl-aniline with formic acid and by cyanoethylating the resulting formyl compound with acrylonitrile in the presence of catalytic amounts of solid sodium hydroxide.

EXAMPLE 2

23.85 g. (0.1 mol) of N-(β-cyanoethyl)-2-chloro-5-methoxy-formanilide (melting point=80° C.) were introduced into 150 ml. of 5N-aqueous hydrochloric acid which had been heated previously to 80° C. The whole was stirred for 30 minutes at this temperature. During the reaction, no complete solution of the organic substances in the aqueous phase was obtained. For isolating the reaction product, the heating bath was replaced by an ice/water bath and during cooling the pH was adjusted within 1 to 2 minutes to 3-4 by means of about 74 ml. of 33% by weight sodium hydroxide solution. Upon cooling, the reaction product crystallized between 50° and 60° C. For completing the crystallization, stirring was continued for 60 minutes at 0°-5° C. The crystal magma was then filtered off with suction and washed until the filtrate was neutral and free from electrolytes. After drying, 21.3 g. (melting point 67°-71° C.) of crude product were obtained. After a single recrystallization from a mixture of alcohol and water, 20.2 g. (96% of the theory) of N-(β-cyanoethyl)-2-chloro-5-methoxyaniline were obtained which were found to melt at 70° to 72° C. A sample recrystallized several times from alcohol was found to melt at 76° C.

The analytical data corresponded to the formula

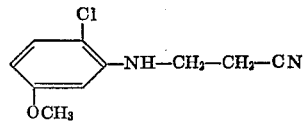

The N-(β-cyanoethyl)-2-chloro-5-methoxy-formanilide was obtained by heating 2-chloro-5-methoxy-aniline with formic acid and cyanoethylating the resulting formyl compound with acrylonitrile in the presence of catalytic amounts of solid sodium hydroxide.

EXAMPLE 3

24.3 g. (0.1 mol) of N-(β-cyanoethyl)-2,5-dichloro-formanilide (boiling point=172° C./0.6 torr, melting point=67° C.) were introduced into 300 ml. of 5N-aqueous hydrochloric acid which had been heated previously to 80° C. The whole was stirred for 30 minutes at this temperature. During the reaction, no complete solution of the organic substances was obtained. For isolating the reaction product, the heating bath was replaced by an ice-water bath and during cooling the pH was adjusted to 3-4 by means of about 140 ml. of 33% by weight of sodium hydroxide solution within 3 to 4 minutes. The product, which at first was obtained in the form of an oily substance, crystallized at temperatures below 20° C. to a colourless coarse-grained mass. For completing the crystallization, it was stirred for 60 minutes at 0°-5° C. The product was then filtered off with suction. It was then washed with water until the filtrate was neutral and free from electrolytes and dried at room temperature. The yield of crude N-(β-cyanoethyl)-2,5-dichloro-aniline was 21.6 g. (melting point=41°-45° C.). After single crystallization from a mixture of alcohol and water there were obtained 20.7 g. (96.5% of the theory) of a colourless finely crystallized product which was found to melt at 43°-46° C. A sample recrystallized several times from alcohol was found to melt at 48° C. The analytical data of this compound were found to correspond to the formula

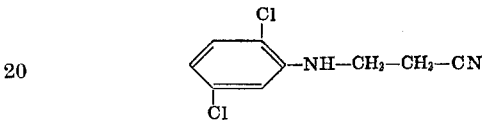

The N-(β-cyanoethyl)-2,5-dichloro-formanilide used as the starting product was obtained by cyanoethylation of 2,5-dichloro-formanilide in the presence of catalytic amounts of a 33% by weight sodium hydroxide solution.

EXAMPLE 4

25.3 g. (0.1 mol) of N-(β-cyanoethyl)-2-bromo-formanilide (boiling point=176° C./1 torr) were introduced into 300 ml. of 5N-aqueous hydrochloric acid which had been heated previously to 80° C. The whole was stirred at this temperature for 30 minutes. The heating bath was then exchanged against an ice/water bath and during cooling the reaction mixture was adjusted to pH 3-4 by means of about 140 ml. of 33% by weight of sodium hydroxide solution. The product, which was obtained at first in oily form, crystallized at temperatures below 10° C. to a colourless coarse-grained mass. The whole was stirred again for 60 minutes at 0°-5° C. Then, the product was filtered off with suction. It was washed with water until the filtrate was neutral and free from electrolytes and dried at room temperature. The yield of N-(β-cyanoethyl)-2-bromo-aniline was 22.4 g. (melting point 34°-38° C.). After a single recrystallization from a mixture of alcohol and water there were obtained 21.8 g. (97% of the theory) of a colourless finely crystallized product which was found to melt at 39°-40° C. A sample, which had been recrystallized several times from alcohol, was found to melt at 41° C. The analytical data of this product were found to correspond to the formula

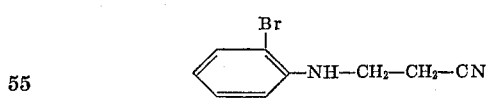

The N-(β-cyanoethyl)-2-bromo-formanilide used as a starting product was obtained by converting 2-bromoaniline with formic acid into 2-bromo-formanilide and by reacting the resulting compound with acrylonitrile in the presence of catalytic amounts of 2N-sodium hydroxide solution.

EXAMPLE 5

24.3 g. (0.1 mol) of N-(β-cyanoethyl)-3,5-dichloro-formanilide (melting point=85° C.) were introduced into a mixture of 50 ml. of 5N-aqueous hydrochloric acid and 50 ml. of ethanol which had been heated to 80° C. The whole was stirred for 30 minutes at this temperature. The heating bath was then replaced by an ice/water bath. During cooling the reaction mixture was neutralized with about 31 ml. of a 33% by weight sodium hydroxide solution. The product precipitated in the form of crystals. These were then filtered off with suction and washed with water until the filtrate was neutral and free from electrolytes. After drying 21.4 g. (99% of the theory) of N-(β- cyanoethyl)-3,5-dichloro-aniline, melting point=76°–77° C. remained behind. A sample recrystallized several times from alcohol was found to melt at 78° C. The analytical data thereof corresponded to the formula

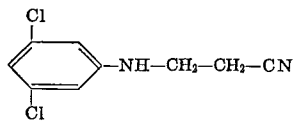

The starting substance used was obtained by formylation and following cyanoethylation of 3,5-dichloro-aniline.

EXAMPLE 6

4.38 g. (0.02 mol) of N-(β-cyanoethyl)-3-nitro-formanilide (melting point=84°–85° C.) were kept for 2 hours, while stirring, at boiling temperature (100° C.) in 100 ml. of 1N-aqueous nitric acid. The heating bath was then exchanged by an ice/water bath. During cooling the reaction mixture was neutralized with 50 ml. of 2N-sodium hydroxide solution and the reaction mixture was cooled to room temperature while stirring. The crystalline product was filtered off with suction, washed until it was neutral and free from electrolytes and dried. The yield was 3.70 g. (97% of the theory), melting point 99°–100° C. of N-(β-cyanoethyl)-3-nitro-aniline. The analytically pure substance was found to melt at 101° C. The analytical data corresponded to the formula

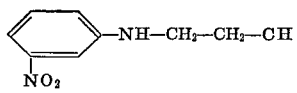

The N-(β-cyanoethyl)-3-nitro-formanilide used as the starting product was obtained by cyanoethylation of 3-nitro-formanilide which had been prepared by heating m-nitro-aniline for several hours in anhydrous formic acid.

EXAMPLE 7

5.95 g. (0.025 mol) of N-(β-cyanoethyl)-2-chloro-5-methoxy-formanilide were dissolved in 50 ml. of glacial acetic acid. 50 ml. of 5N-aqueous hydrochloric acid were added to this solution at room temperature (about 20° C.) and the reaction mixture was then stirred at the same temperature. After 75 hours the mixture was neutralized with about 100 ml. of a 33% by weight sodium hydroxide solution (pH=>7) and diluted with 100 ml. of water. It was then cooled to 0°–5° C. After having stirred the whole for 2 hours at this temperature, the crystalline reaction product was filtered off with suction, washed neutral and free from electrolytes and dried. 5.15 g. (98% of the theory) of N-(β-cyanoethyl)-2-chloro-5-methoxy-aniline melting at 73°–75° C. were obtained. The analytically pure compound was found to melt at 76° C. and corresponded to the formula

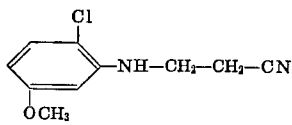

EXAMPLE 8

Industrial dodecyl-aniline was reacted in the usual manner with formic acid and the N-formyl compound obtained was then cyanoethylated with acrylonitrile in the presence of catalytical amounts of sodium hydroxide.

For splitting off the formyl group, 230 g. (0.67 mol) of distilled N-(β-cyanoethyl)-dodecyl-formanilide were dissolved in 100 ml. of ethanol and added, within in 15 minutes, to a mixture of 750 ml. of ethanol and 500 ml. of 5N-hydrochloric acid, which had been heated to 80° C. The mixture was then cooled and simultaneously neutralized with about 300 ml. of 33% by weight sodium hydroxide solution (pH=7). The product which had been obtained in oily form, was dissolved in 200 ml. of benzene, separated from the mother liquor in a separating funnel and washed twice with about 200 ml. of water until it was practically free from electrolytes. From the dried solution, the benzene was distilled off and the remaining viscous crude product which had a slight orange colour was then fractionated under reduced pressure at 0.1 torr, whereby the following fractions were obtained:

1. 81°–146° C., 6.45 g.
2. 146°–162° C., 25.1 g.
3. 160°–171° C., 161 g. and
4. Residue 7.9 g.

The yield of the main fraction (160°–171° C.) of N-(β-cyanoethyl)-dodecyl-aniline was 76% of the theory, referred to the N-(β-cyanoethyl) - dodecyl - formanilide used at the beginning. The analytical data of this product $C_{21}H_{34}N_2$ (314.5), calculated: base nitrogen 4.45, total nitrogen 8.9, found: base nitrogen 4.2, total nitrogen 9.2, corresponded to the formula

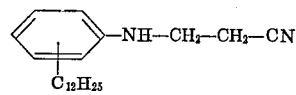

EXAMPLE 9

24.1 g. (0.08 mol) of 3-(bis-trifluoromethyl-methoxy-methyl)-formanilide and 0.05 g. of ground sodium hydroxide pellets were well mixed with one another in a mortar under exclusion of air and introduced into a flask having several necks and a capacity of 250 ml. Then, 5.1 g. (0.08 mol + 20%) of acrylonitrile were added dropwise at 60°–80° C. The starting mixture which at first was powdery soon passed into a well stirrable viscous mass. For completing the reaction, the whole was stirred for one hour at 70° C. The formyl group was then split off during 30 minutes at 80° C. by means of 100 ml. of 5N-hydrochloric acid. The heating bath was then replaced by an ice/water bath and, during cooling, neutralization was effected with about 55 ml. of 33% by weight of sodium hydroxide solution. The reaction product which was oily at first crystallized slowly below 10° C. For completing the crystallization, the whole was stirred for one hour at 0°–5° C. Thereupon, the product was filtered off with suction, washed until the filtrate was neutral and free from electrolytes and dried at room temperature. 26.3 g. of crude N-(β-cyanoethyl)-3-(bis-trifluoromethyl-methoxy-methyl)-aniline having a melting point of 56°–60° C. were isolated. After recrystallization from a mixture of alcohol and water, 25 g. (96% of the theory) remained behind. After several recrystallizations of the compound which corresponded to the formula

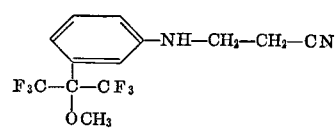

the compound was found to melt at 63°–65° C. The analytical data of the compound corresponded to the formula.

EXAMPLE 10

19 g. (0.1 mol) of 2,5-dichloroformanilide were combined with 0.5 ml. of 33% by weight sodium hydroxide solution and the whole was introduced in a flask with several necks and having a capacity of 250 ml. The flask was immersed in a heating bath having a temperature of 80° C. Under dropwise addition of 6.4 g. (0.1 mol + 20%) of acrylonitrile, the at first powdery reaction mixture liquefied to give a viscous mass. For completing the reaction, the whole was stirred for one hour at 70° C. Then, 50 ml. of 5N-hydrochloric acid and 50 ml. of ethanol were added to the reaction mixture and saponification was carried out for 30 minutes at 80° C. The heating bath was then replaced by an ice/water bath and during cooling the mixture was rendered alkaline to phenolphthaleine by means of about 30 ml. of 33% by weight sodium hydroxide solution. The reaction product, which at first was an oily product, crystallized at a temperature below 20° C. For completing the crystallization, the whole was stirred for one hour at 0°–5° C. Thereupon, the product was filtered off with suction, washed with water until the filtrate was neutral and free from electrolytes, and dried. The yield was 21.5 g. (melting point=39°–44° C.). After a single recrystallization from a mixture of alcohol and water there remained behind 19.9 g. (93% of the theory) of N-(β-cyanoethyl)-2,5-dichloro-aniline, which was found to melt clearly at 42°–46° C. The analytically pure substance was found to melt at 48° C. and corresponded to the formula

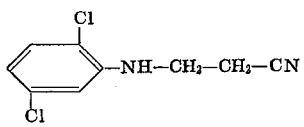

EXAMPLE 11

7.9 g. (0.04 mol) of 4-phenylformanilide were pulverized and added, together with 2.5 g. (0.04 mol + 23%) of acrylonitrile and 1 ml. of 2N-sodium hydroxide solution to 30 ml. of ethyleneglycol-dimethyl-ether. The whole was heated for 2 hours to 80° C., while stirring. At the end of the cyanoethylation, the reaction mixture was present in the form of a solution. For splitting off the formyl group, 40 ml. of 5N-hydrochloric acid were added and the whole was stirred for 30 minutes at 80° C. Thereupon, the reaction medium was rendered alkaline to phenolphthaleine by means of 23 ml. of 33% by weight sodium hydroxide solution. The reaction product precipitated partly. For completing the precipitation, water (about 100 ml.) were added and the whole was cooled to 0°–5° C. The reaction product was filtered off with suction, washed until the filtrate was neutral and free from electrolytes and dried at 60° C. in a drying cabinet. 8.7 g. (98% of the theory) of N-(β-cyanoethyl)-4-phenyl-aniline (melting point=145° C.) were obtained. A sample recrystallized several times from alcohol was found to melt at 146° C. and to correspond to the formula

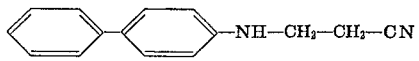

EXAMPLE 12

123 g. (1 mol) of p-anisidine were reacted for one hour, while stirring, at 90°–100° C., with 69 g. (1.5 mol) of 100% formic acid. For the cyanoethylation of the form-anilide formed, there were added, at 40°–60° C. in the order indicated, 63 g. (1 mol + 19%) of acrylonitrile, 50 ml. of water and 48 ml. of 33% by weight sodium hydroxide solution to the reaction mixture. In order to complete the reaction, the whole was stirred for one hour at 60° C. For splitting off the formyl group, the reaction mixture was at first heated to 80° C. Then, it was combined with 200 ml. of concentrated hydrochloric acid and the whole was stirred for 30 minutes at 80° C. The heating bath was then replaced by an ice/water bath. During cooling, the pH-value was adjusted to 4–7 by means of about 200 ml. of 33% by weight sodium hydroxide solution. The reaction product, which at first separated in oily form, started to crystallize at 40° C. It was filtered off with suction at 0°–5° C., washed with water until the filtrate was neutral and free from electrolytes and dried. 175 g. (melting point=58°–61° C.) of crude product were obtained. After a single recrystallization from a mixture of alcohol and water, 165 g. (94% of the theory) of N-(β-cyanoethyl) - 4 - methoxy-aniline melting at 61°–62° C. and corresponding to the formula

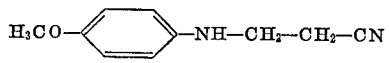

were obtained.

EXAMPLE 13

510 g. (4 mols) of 2-chloro-aniline and 297 g. (6 mols) of formic acid in the form of a 93% product were stirred for 3 hours at 70° C. in a flask having four necks and the capacity of 6 liters.

For the cyanoethylation of the resulting formyl compound, the bath which had a temperature of 70°–80° C. was exchanged for a bath which had a temperature of about 25° C. The following components were then added rapidly, while stirring vigorously, to the reaction mixture: 240 g. (4 moles + 13%) of acrylonitrile, 1,400 ml. of ice/water and 320 ml. of 33% by weight sodium hydroxide solution. After this addition, the reaction mixture showed a temperature of 35°–40° C. About 240 ml. of sodium hydroxide solution were consumed for the neutralization of the excess formic acid. The remaining 80 ml. of sodium hydroxide were required to render the reaction medium neutral, which process observed by the addition of a phenolphthaleine solution. The formyl compound which precipitated in the form of coarse crystals liquefied soon during the cyanoethylation. The reaction was carried out during 3 hours, at 30°–40° C. and while stirring. For saponifying the formyl group, the reaction mixture was at first rendered neutral to phenolphthaleine by means of about 64 ml. of concentrated hydrochloric acid and then heated to 70° C. When this temperature was reached, 1,336 ml. of concentrated hydrochloric acid were added and the whole was stirred for 40 minutes at 70° C. During this time the reaction mixture, which at first had a milky, turbid appearance, eventually became clear and colourless.

For precipitating the N-(β - cyanoethyl) - 2 - chloroaniline, the heating bath was replaced by an ice/water bath and neutralization was started before the reaction mixture had cooled. The pH-value was adjusted to 1–2 by means of 1200 ml. of 33% by weight sodium hydroxide solution (glass electrode). Temporarily, the temperature rose, for example, 60°–85° C. The whole was stirred for some minutes. After 15 minutes the oily reaction product which corresponded to the formula

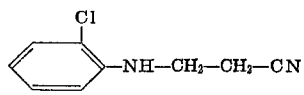

and which had accumulated in the meantime at the bottom of the reaction flask was transferred into a separating funnel by means of a siphon. It was extracted with water and then transferred into a storing bottle.

The crude product was almost colourless. It contained about 3% of foreign substances of which about 1% was the humidity included which gave the product its turbid appearance. Not reacted 2-chloro-aniline was present only in traces (less than 1%). The yield was 686 g. of 97% crude product, which corresponded to 92% of the theory.

EXAMPLE 14

14.8 g. (0.05 mol) of N-(β-cyanoethyl)-2-methoxy-5-ethylsulfonyl-formanilide (melting point=105°–106° C.) (obtained by N-formylation of 2-methoxy-5-ethylsulfonyl-aniline by means of formic acid and subsequent N-cyanoethylation by reaction with acrylonitrile in a medium which was alkaline to phenolphthaleine) were introduced at room temperature into a mixture of 50 ml. of 5N-aqueous hydrochloric acid and 50 ml. of ethanol. The whole was heated within 15 minutes to 80° C., while stirring, and this temperature was then maintained for 30 minutes. The heating bath was then removed, the mixture was cooled in an ice-water bath and neutralized with about 26 ml. of 33% by weight of sodium hydroxide solution. In order to obtain an as complete as possible precipitation of the reaction product, 50 ml. of water were added to the mixture and the whole was stirred for one hour at 0°–5° C. The practically colourless product which had precipitated in crystalline form was filtered off with suction, washed with water until the filtrate was neutral and free from electrolytes. The product was dried. 13.1 g. (98% of the theory) of N-(β-cyanoethyl)-2-methoxy-5 - diethylsulfonyl - aniline were obtained (melting point 110°–112° C.). A sample thereof, which had been recrystallized several times, was found to melt at 113° to 114° C. The data determined by analysis corresponded to the formula

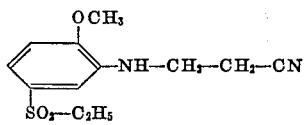

The following Table lists other N-(β-cyanoethyl)-anilines which were obtained with high uniformity in a manner analogous to that described in Example 1, the yields ranging between 91% and 98%, referred to the N-(β-cyanoethyl)-formanilide used. The melting points of the analytically pure compounds are indicated in the last column.

TABLE

| No. | N-(β-cyanethyl)-aniline | M.P. (° C.) |
|---|---|---|
| 1 | | 38 |
| 2 | | 94 |
| 3 | | 73 |
| 4 | | 90 |
| 5 | | 66 |
| 6 | | 153 |

EXAMPLE 15

1.94 g. (0.01 mol) of 2-amino-6-ethoxy-benzene were diazotized for three hours at —5° C. in 20 ml. of concentrated sulfuric acid with nitrosyl-sulfuric acid corresponding to 0.69 g. of sodium nitrite. On the other hand, 2.73 g. (0.01 mol) of N-(β-cyanoethyl)-2-phenoxy-5-chloro-aniline were dissolved in 100 ml. of glacial acetic acid and 5 ml. of 5N-hydrochloric acid. The previously prepared diazonium salt solution was added dropwise at 0°–5° C. to this solution. For completing coupling, the whole was stirred at this temperature and the mineral acids were then neutralized by addition of 4N-sodium acetate solution. The dyestuff which precipitated in the form of a dry powder was filtered off, washed with water and dried. The composition of the dyestuff obtained corresponded to the formula

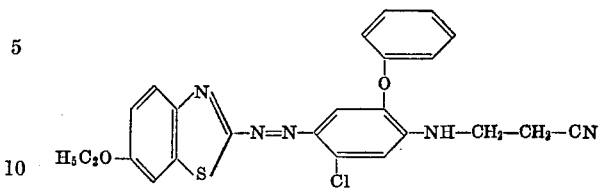

This new dyestuff yielded, when used for the dyeing of polyethylene-glycol-terephthalate fibers from an aqueous dispersion, with good tinctorial yields, brilliant orange dyeings that had very good fastness to rubbing and to sublimation.

EXAMPLE 16

(a) 2-Foramino-naphthalene: 71.5 g. (0.5 mol) of 2-amino-naphthalene and 46 g. (1 mol) of formic acid were combined and kept for 4 hours at 110° C., while stirring. The reaction mixture was then added, while stirring, to a mixture of ice and water, the reaction product that had precipitated was filtered off with suction, washed with water until the filtrate was neutral and dried in a drying cabinet. 84 g. (97% of the theory) of 2-foramino-naphthalene melting at 129° C. (C. Liebermann, P. Jacobson, Liebigs Ann. Chem. *211*, 42 (1882): melting point=129° C.) were obtained.

(b) 2-[N-(β-cyanoethyl) - N - formyl-amino]-naphthalene: 17.1 g. (0.1 mol) of 2-foramino-naphthalene were at first intimately mixed with 0.3 g. of pulverized 100% sodium hydroxide solution and then combined dropwise during about 5 minutes, at 60°–80° C., with 6.3 g. (0.12 mol) of acrylonitrile. Thereupon, the reaction mixture which had a powdery form turned into a viscous liquid. For completing the reaction, the whole was stirred for 3 hours at about 70° C. For working-up, the mixture was dissolved in 100 ml. of ethanol, while heating, any sodium hydroxide solution still present was neutralized with a correspondingly low amount of acetic acid and the reaction product was allowed to crystallize while cooling to 0°–5° C., filtered off with suction, washed with a small amount of alcohol and dried. 21 g. (93.8% of the theory) of crude 2-[N-(β-cyanoethyl)-N-formyl-amino]-naphthalene (melting point 88°–91° C.) were obtained, the melting point of which after several recrystallizations in alcohol was found to be at 90°–92° C.

(c) 2-[-(β - cyanoethyl)-amino]-naphthalene: 11.2 g. (0.05 mol) of 2-[N-(β-cyanoethyl)-N-formyl-amino]-naphthalene were kept for 30 minutes at 80° C., while stirring, in a mixture of 20 ml. of ethanol and 25 ml. of 5N-hydrochloric acid. The whole was then neutralized with about 12 ml. of 33% by weight sodium hydroxide solution, the reaction mixture was cooled to 0°–5° C. and the reaction product which had separated in the form of almost colourless crystals was filtered off with suction, washed with water until the filtrate was free from electrolytes and dried at 60° C. in a drying cabinet. 9.2 g. (94% of the theory) of 2-[N-(β-cyanoethyl)-amino]-naphthalene were obtained which were found to melt at 100°–105° C. The compound which was recrystallized from alcohol corresponded with its analytical data to the formula

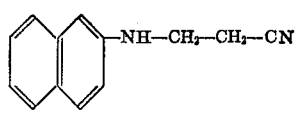

and was found to have a constant melting point of 106°–107° C.

In a manner analogous to that described under (c), the 1-[N-(β-cyanoethyl)-4-nitro]naphthalene of the formula

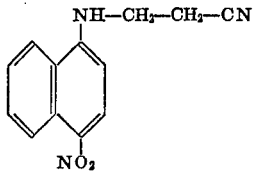

can be obtained with a 93% yield from its N-cyanoethyl-N-formyl compound. Melting point 171°–172° C.

EXAMPLE 17

42.9 g. (0.3 mol) of 1-amino-naphthalene were dissolved in a flask having four necks and a capacity of one liter were dissolved in 50 ml. of diethylene-glycol-dimethyl-ether, combined with 55 g. (1.2 mol) of formic acid and stirred for 1½ hours at 80°–90° C. Thereby, 1-formyl-amine-naphthalene was formed. In order to cyanoethylate this compound, the heating bath was removed and the reaction mixture was cooled to about 40° C. Then, 28.3 g. (0.45 mol) of acrylonitrile and about 80 ml. of 33% by weight sodium hydroxide solution were added rapidly, while stirring, to the reaction mixture. In this respect, the amount of sodium hydroxide solution should be such that the reaction mixture in its aqueous phase shows an alkaline reaction to phenolphthalene only upon addition of the last 1 or 2 ml., which can be observed easily with some drops of an indicator solution of phenolphthaleine in diethylene-glycol-dimethyl-ether. After the addition of the sodium hydroxide solution, the reaction mixture withing the flask had a temperature of 85°–95° C. At this temperature, the cyanoethylation of the N-formyl compound was practically completed already after 15 minutes.

For hydrolyzing the 1-[N-(β-cyanoethyl)-N-formyl-amino]-naphthalene, there were introduced, in the order indicated, 200 ml. of ethanol, 100 ml. of water and 200 g. of concentrated hydrochloric acid, into the reaction flask and the mixture was stirred for 2.5 hours at 70°–80° C. Thereupon, the clear, slightly brown solution was cooled and neutralized to pH 2 by means of about 100 ml. of 33% by weight sodium hydroxide solution. The reaction product which at first had the form of an oil crystallized soon and was filtered off with suction at 0°–5° C. A colourless to slightly gray coloured compound was isolated, which was found to melt, with the exception of included sodium salts, at 63°–67° C. When the compound was recrystallized once from a mixture of alcohol and water, 53.5 g. (91% of the theory) of a compound melting at 67°–69° C. were obtained. A sample recrystallized several times from alcohol was found to have a constant melting point at 69°–70° C. [S. A Heininger, J. Org. Chemistry 22, 1213 (1957): melting point 69°–70° C.]. The analytical data determined were found to correspond with the formula

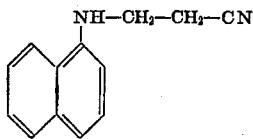

EXAMPLE 18

5.5 g. (0.02 mol) of 2-[N-(β-cyanoethyl)-N-formyl-amino]-anthracene (melting point=196° C.), obtained by the reaction of 2-formylamino-anthracene with acrylonitrile in the presence of dilute sodium hydroxide solution using diethylene-glycol-dimethyl-ether as the reaction medium, were dissolved in 100 ml. of glacial acetic acid, while heating, and then combined at about 80° C. with 25 ml. of 5N-hydrochloric acid, whereupon a turbidity was observed which, however, disappeared in the course of the reaction which lasted for 35 minutes at 80° C. For separating the reaction products the hydrochloric acid was neutralized with a 4N-sodium acetate solution, the precipitation was completed by the addition of 100 ml. of water and the product that had precipitated was filtered off with suction at room temperature, washed with water until it was free from acetic acid and then dried. 4.3 g. (87% of the theory) of 2-[N-(β-cyanoethyl)-amino]-anthracene were obtained. The compound was found to melt at 160°–171° C. A sample thereof, recrystallized twice from alcohol, showed a constant melting point at 195° C. and analytical data corresponded to the formula

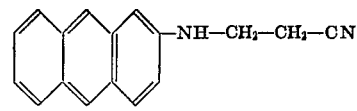

In a manner similar to that described in Example 3, the 2-[N - (β - cyanoethyl)-amino]-anthraquinone (melting point 236° C.) and corresponded to the formula

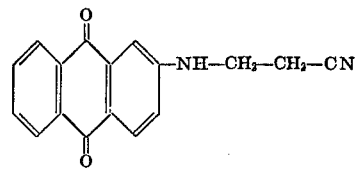

could likewise be obtained with good yields from 2-N-(β-cyanoethyl) - N - formyl-amino-anthraquinone (melting point 183°–184° C.).

EXAMPLE 19

0.49 g. (0.005 mol) of aniline were diazotized in 7.5 ml. of 1N-hydrochloric acid in the presence of about 20 g. of ice by the addition of 5 ml. of 1N-sodium hydroxide solution. The diazonium salt solution obtained was clarified and added to a solution of 1.23 g. (0.005 mole) of 1-[N-(β-cyanoethyl)-amino]-anthracene in 2.5 ml. of 1N-hydrochloric acid and 20 ml. of glacial acetic acid. The coupling mixture was then stirred for about 30 minutes at 0°–5° C. and the pH-value was adjusted to 4–5 by addition of a 4N-sodium acetate solution. The red dyestuff thus formed, which corresponded to the formula

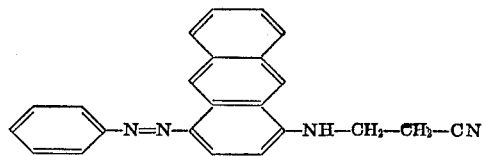

was filtered off, washed with water until the filtrate was neutral and free from electrolytes and eventually dried.

When used in the dyeing of polyethylene-glycol-terephthalate fibers from an aqueous dispersion, the new dyestuff yielded, with good tinctorial yields, clear, yellowish red dyeings which showed very good fastness to rubbing and to sublimation.

The compounds used as the coupling components can be obtained according to the process of the invention by reacting 1-amino-anthracene with formic acid and by cyano-ethylating the N-formyl compound, obtained after working-up, in diethylene-glycol-dimethyl-ether in the alkaline pH-range. Hydrolysis of the N-formyl-N-cyanoethyl compound to give the 1-[N-(β-cyanoethyl)-amino]-anthracene of the formula

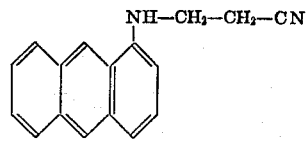

was effected in a mixture of methanol and 5N-hydrochloric acid in a proportion of 1:1 by volume. The compound could be recrystallized from a mixture of cyclohexane and ethyl acetate, had a yellow green appearance and was found to have a constant melting point of 132° C.

I claim:
1. A process for the manufacture of an N-mono-(β-cyanoethyl)-arylamine of the formula

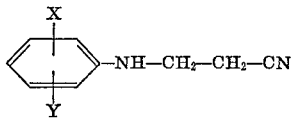

wherein X is hydrogen, fluorine, chlorine, bromine, alkyl of 1 to about 15 carbon atoms, lower alkoxy, acetyl, trifluoromethyl, phenyl, phenoxy, benzoyl, alkylsulfonyl of 1 to about 6 carbon atoms or N,N-di(lower alkyl)-aminosulfonyl and Y is hydrogen, fluorine, chlorine, lower alkyl, lower alkoxy, nitro, trifluoromethyl or di(trifluoromethyl)-lower alkoxy methyl which comprises treating an N-mono-(β-cyanoethyl)-N-phenylformamide of the formula

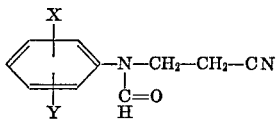

with a diluted aqueous mineral acid at a temperature between about 0° and about 100° C.

2. A process according to claim 1 wherein said diluted mineral acid is hydrochloric, sulfuric, phosphoric or nitric acid of about 1% to about 30% strength.

3. A process according to claim 1 wherein said treatment is at about 60° to about 90° C. with about 2N to about 7N hydrochloric acid.

4. A process according to claim 1 wherein said treatment is in the presence of acetic acid, lower alkanol, ethylene-glycol or ethylene-glycol lower alkyl ether as a solubilizer.

5. A process for the manufacture of a β-cyanoethyl-aminobenzene of the formula

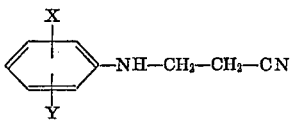

wherein the radical

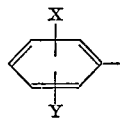

represents phenyl, chlorophenylene, bromophenylene, fluorophenylene, nitrophenylene, alkylphenylene, lower alkoxyphenylene, trifluoromethyl - phenylene, phenyl-phenylene, acetyl-phenylene, benzoyl-phenylene, phenoxy-phenylene, di(trifluoromethyl)-lower alkoxy - methyl-phenylene, dichlorophenylene, chloro-lower alkyl-phenylene, chloro-lower alkoxy-phenylene, alkyl-lower alkoxy-phenylene, N,N-di(lower alkyl)aminosulfonyl-phenylene, lower alkyl-N,N-di(lower alkyl)aminosulfonyl-phenylene, lower alkoxy-N,N-di(lower alkyl)aminosulfonyl-phenylene, lower alkyl-lower alkylsulfonyl-phenylene, lower alkoxy-lower alkylsulfonyl-phenylene, trifluoromethyl-lower alkylsulfonyl-phenylene, trifluoromethyl-fluoro-phenylene or phenoxy-chloro-phenylene which comprises treating an N-[β-cyanoethyl]-N-phenylformamide of the formula

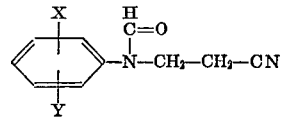

with a diluted aqueous mineral acid at a temperature between about 0° C. and about 100° C.

6. A process according to claim 1 wherein said N-mono-(β-cyanoethyl)-arylamine is

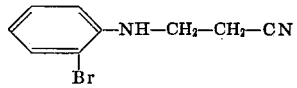

and said phenylformamide is

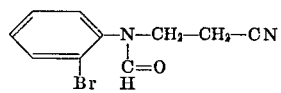

References Cited

UNITED STATES PATENTS

| | | | |
|---|---|---|---|
| 2,819,197 | 1/1958 | Santmyer et al. | 260—465 E |
| 2,109,024 | 2/1938 | Holzach et al. | 260—205 |
| 3,081,295 | 3/1963 | Sterling | 260—205 |
| 2,941,992 | 6/1960 | Rhyner | 260—205 |
| 3,681,425 | 8/1972 | Kiehs | 260—465 E |

OTHER REFERENCES

Sidgwick's The Organic Chemistry of Nitrogen, Clarendon Press, Oxford. 1956, pp. 225–226.

LORRAINE A. WEINBERGER, Primary Examiner

C. F. WARREN, Assistant Examiner

U.S. Cl. X.R.

260—465 D, 158, 192, 205, 371, 376, 378, 380, 381; 71—105